W. EVANS.
Machines for Forging Spring-Plates.
No. 147,919. Patented Feb. 24, 1874.
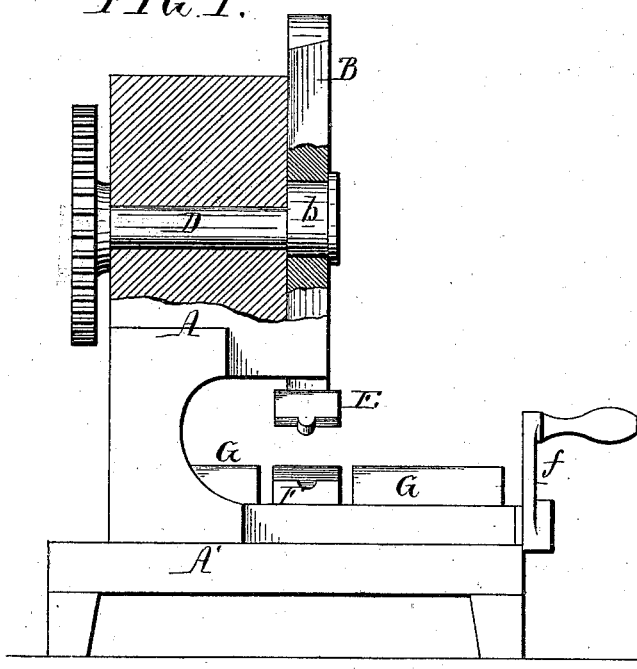
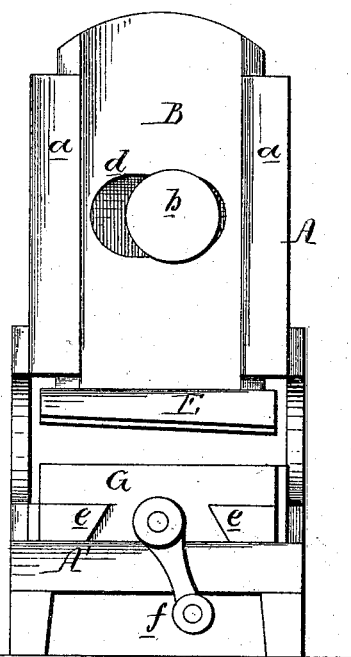
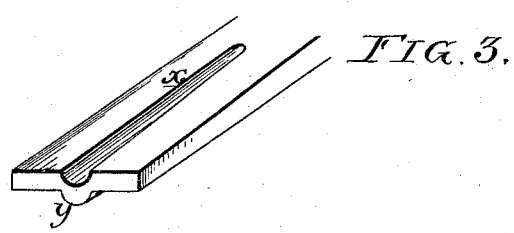
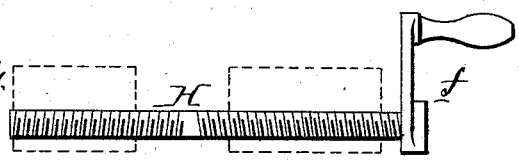
Witnesses, Harry Smith
Hubert Howson
William Evans.
By his Attys.
Howson and Son.

UNITED STATES PATENT OFFICE.

WILLIAM EVANS, OF PHILADELPHIA, PENNSYLVANIA, ASSIGNOR TO HIMSELF, JOHN BENEZET, LEWIS T. MATLOCK, AND GEORGE E. EVANS, OF SAME PLACE.

IMPROVEMENT IN MACHINES FOR FORGING SPRING-PLATES.

Specification forming part of Letters Patent No. 147,919, dated February 24, 1874; application filed October 17, 1873.

*To all whom it may concern:*

Be it known that I, WILLIAM EVANS, of Philadelphia, Pennsylvania, have invented a Machine for Forging Spring-Plates, of which the following is a specification:

The object of my invention is to forge the leaves of that class of springs in which a longitudinal rib or one leaf is adapted to a corresponding groove on an adjoining leaf, so that when fitted together the several leaves shall be maintained in their proper lateral positions; and this object I attain by the machine represented in the side view, Figure 1, and front view, Fig. 2, of the accompanying drawing.

A is the frame of the machine, in front of which are guides $a\ a$ for the slide B, a vertical reciprocating motion being imparted to the latter by a crank-pin or eccentric, $b$, on the driving-shaft D, the said crank-pin being adapted to a transversely-elongated slot, $d$, in the slide. To the lower end of this slide is secured the upper die E, and to the base A' of the frame is secured the lower die F, on each side of which is a jaw, G, adapted to guides $e\ e$ on the base A', the two jaws being controlled by a screw-shaft, H, having a right-handed thread adapted to a nut on one jaw, and a left-handed thread adapted to a nut in the other jaw, as shown in the vertical section, Fig. 4, so that the jaws must move simultaneously from or toward each other, according to the direction in which the handle $f$ on the screw-shaft is turned. The upper die E is inclined, as shown in Fig. 2, in accordance with the taper to be imparted to the leaf, Fig. 3, of the spring, and on the inclined surface of this die is a rib for forming the depression $x$ in the leaf, the lower die having a groove for the formation of the rib $y$. When the slide B and its die E are in an elevated position, and the jaws G G are open, as shown in Fig. 1, the bar of iron or steel to be converted into the leaf of a spring is, while in a red-hot state, placed on the die F, and the jaws are then closed on the bar, so as to insure the straightness of the opposite edges, after which the slide B, with its die, descends, and, in conjunction with the die F, imparts the desired shape, Fig. 3, to the leaf, and forms the groove $x$ in, and the rib $y$ on, the same.

It will be seen that the jaws G G perform the twofold duty of straightening the bar laterally and of adjusting it to the proper position for insuring the formation of the groove and rib in the proper position on the said bar.

I claim as my invention—

1. The combination of the movable inclined die E and its rib with the fixed die F and its groove.

2. The combination of the dies E and F with the straightening and retaining jaws G G.

In testimony whereof I have signed my name to this specification in the presence of two subscribing witnesses.

WILLIAM EVANS.

Witnesses:
   WM. A. STEEL,
   HARRY SMITH.